US012665666B2

(12) United States Patent
Howland et al.

(10) Patent No.: US 12,665,666 B2
(45) Date of Patent: Jun. 23, 2026

(54) SYSTEM AND METHODS OF DETECTING LOSS OF SIGNAL IN FREE SPACE OPTICAL COMMUNICATIONS

(71) Applicant: CACI, INC.-FEDERAL, Reston, VA (US)

(72) Inventors: Craig Darren Howland, Neptune, NJ (US); Leonid Ayzenshtat, Succasunna, NJ (US)

(73) Assignee: CACI, Inc.—Federal, Reston, VA (US)

( * ) Notice: Subject to any disclaimer, the term of this patent is extended or adjusted under 35 U.S.C. 154(b) by 499 days.

(21) Appl. No.: 18/128,671

(22) Filed: Mar. 30, 2023

(65) Prior Publication Data

US 2024/0333382 A1 Oct. 3, 2024

(51) Int. Cl.
H04B 10/079 (2013.01)
H04B 10/118 (2013.01)

(52) U.S. Cl.
CPC ....... H04B 10/0795 (2013.01); H04B 10/118 (2013.01)

(58) Field of Classification Search
None
See application file for complete search history.

(56) References Cited

U.S. PATENT DOCUMENTS 6,046,574 A * 4/2000 Baranowski ....... G01R 31/3648
320/132
6,919,716 B1 7/2005 Buehler 7,539,423 B2 5/2009 Robinson et al.
7,806,603 B2 * 10/2010 Izumo ................... G08C 23/06
385/89
9,571,194 B2 * 2/2017 Burch ................... B64G 1/428
10,581,525 B2 * 3/2020 Velazco ................ H04B 10/66
11,196,487 B1 * 12/2021 Fujita ................ H04B 10/1143
11,442,195 B2 * 9/2022 Kare ........................ G01V 8/22
12,040,841 B2 * 7/2024 Takada ................ H04B 10/807
2008/0235418 A1 * 9/2008 Werthen .............. H04B 10/807
710/106
2016/0134370 A1 * 5/2016 Huang ................... H02J 50/30
398/118
2017/0272157 A1 * 9/2017 Crowne .............. H04B 10/807

(Continued)

OTHER PUBLICATIONS

Chapter 2: "Signal Detection in Laser-Based Systems"; pp. 21-55.

(Continued)

*Primary Examiner* — Jai M Lee
(74) *Attorney, Agent, or Firm* — BakerHostetler

(57) ABSTRACT

The present application at least describes a system for detecting loss in free space optical communications (FSOCs). The FSOC may include a sensor located downstream of the power supply unit. The FSOC may also include a signal conditioning unit (SCU) located downstream of the sensor. The FSOC may also include a comparator located downstream of the SCU. The comparator may be configured to receive the first signal from the SCU and determine an indication of signal loss based upon the first signal being below a predetermined threshold. The FSOC may further include a photodiode located downstream of the sensor. The photodiode may be configured to receive power from the power supply, receive an optical signal from a source, and output a second signal based on the optical signal.

10 Claims, 6 Drawing Sheets

500

502
Monitoring a current of a voltage supply transmitted to a photodiode in a FSO system 504
Determining whether the current is below a predetermined threshold to indicate a signal loss of the communication link 506
The indication of signal loss is transmitted to a processing system 508
Receive, via the processing system, feedback that a clock associated with the communication link was frozen at an instance prior to the indication of signal loss of the communication link

(56) References Cited

U.S. PATENT DOCUMENTS

| 2019/0036601 A1 | 1/2019 | Ray | |
| 2024/0429752 A1* | 12/2024 | Biderman | H02J 50/30 |
| 2025/0007387 A1* | 1/2025 | Lee | H02J 7/35 |

OTHER PUBLICATIONS

Jim Williams; "Bias Voltage and Current Sense Circuits for Avalanche Photodiodes"; Linear Technology Corporation; Application Note 92; Nov. 2002; pp. 1-32.

* cited by examiner

100

101

104b

102b

102a

104a

103b

103a

500

502

Monitoring a current of a voltage supply
transmitted to a photodiode in a FSO system

504

Determining whether the current is below a
predetermined threshold to indicate a signal loss
of the communication link

506

The indication of signal loss is transmitted to a
processing system

508

Receive, via the processing system, feedback
that a clock associated with the communication
link was frozen at an instance prior to the
indication of signal loss of the communication
link

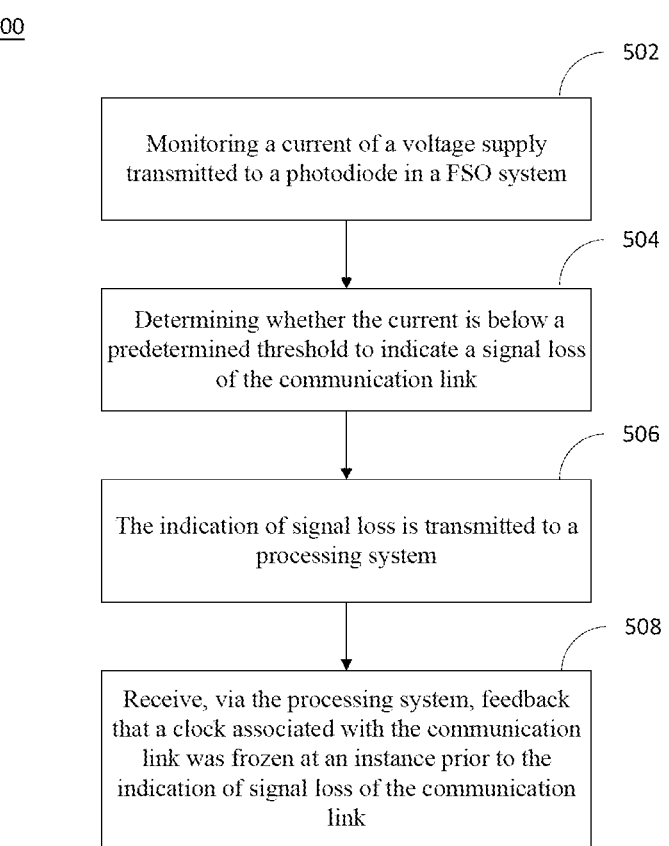

SYSTEM AND METHODS OF DETECTING LOSS OF SIGNAL IN FREE SPACE OPTICAL COMMUNICATIONS

BACKGROUND

Free space optical communications (FSOCs) are generally employed in military, civil and commercial applications. Typically, an FSOC system may include a transmitting terminal and a receiving terminal. The transmitting terminal may wirelessly transmit an optical signal carrying data to the receiving terminal. The optical signal may be propagated via a laser. The receiving terminal may subsequently convert the received optical signal into an electrical signal.

Generally, the optical signal propagating via a laser operates under atmospheric conditions. At time, these atmospheric conditions may include atmospheric fades, such as for example turbulence, clouds and rain. Depending upon the magnitude of the atmospheric fade, a momentary or continued loss of signal may be detected between the transmitter and receiver. Rapidly restoring communication after the atmospheric fade has passed is of paramount importance.

Some conventional systems for detecting a loss of signal in FSOCs may be large and heavy. Other conventional systems for detecting loss of signal may be unreliable. This may be attributed to the location where detection is performed. In other conventional systems, detecting loss of signal may compromise characteristics of the data signal.

What is desired in the art is an FSOC system exhibiting lower size, weight and power (SWAP) characteristics in view of conventional systems.

What is also desired in the art is an FSOC system and technique that reliably detects loss of signal and quickly restores communication after atmospheric fade has passed.

What is further desired in the art is an FSOC system and technique that does not compromise a data signal based on detecting a loss of signal.

SUMMARY

In one aspect, a system for detecting loss of signal in FSOCs is described. The system may include a power supply unit. The FSOC may include a sensor located downstream of the power supply unit. The sensor may be configured to monitor current of the power supply unit. The FSOC may also include a signal conditioning unit (SCU) located downstream of the sensor. The SCU may be configured to receive a first signal associated with the monitored current. The FSOC may also include a comparator located downstream of the SCU. The comparator may be configured to receive the first signal from the SCU and determine an indication of signal loss based upon the first signal being below a predetermined threshold. The FSOC may also include a photodiode located downstream of the sensor. The photodiode may be configured to receive power from the power supply, receive an optical signal from a source, and output a second signal based on the optical signal.

In another aspect, the application also describes a method for detecting loss in FSOCs. The method may include a step of monitoring a current of a voltage supply being transmitted to a photodiode. The current may be associated with a communication link. The method may also include a step of determining, via a comparator, a first signal associated with the current is below a predetermined threshold indicating signal loss of the communication link. The method may also include a step of transmitting the indication of signal loss to a processing system. The method may further include a step of receiving, via the processing system, feedback that a second signal associated with the communication link was frozen at an instance prior to the indication of signal loss.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The accompanying drawings, which are incorporated in and constitute a part of this specification, illustrate embodiments and together with the description, serve to explain the principles of the methods and systems.

FIG. 5 depicts an example method in accordance with an aspect of the application.

DETAILED DESCRIPTION OF THE ILLUSTRATIVE EMBODIMENTS

Described herein are devices, methods, and systems for detecting loss of signal in FSOCs. The architectures discussed herein may be implemented in one or more FSOC applications. The description to follow describes FSOCs in the context of an exemplary aspect directed to a space-based communication network. The communication network may comprise a plurality of space objects, such as satellites, space stations, spaceships, and/or the like. The communication network may operate in one or more environments including ground-to-ground, ground-to-space, air-to-air, and ground-to-air. The communication network may also comprise a satellite constellation network. The communication network may comprise a mesh network. The communication network may be configured to provide a global network for connecting to the internet via communications between the ground and space objects.

The disclosed techniques may be used to implement a device exhibiting very compact, low weight, low power consuming optical communications terminal, capable of bi-directional high-speed communications. Such a device would have obvious benefits for spaced-based communications networks, where payload size, mass and power efficiency are important attributes.

Figure 1A:
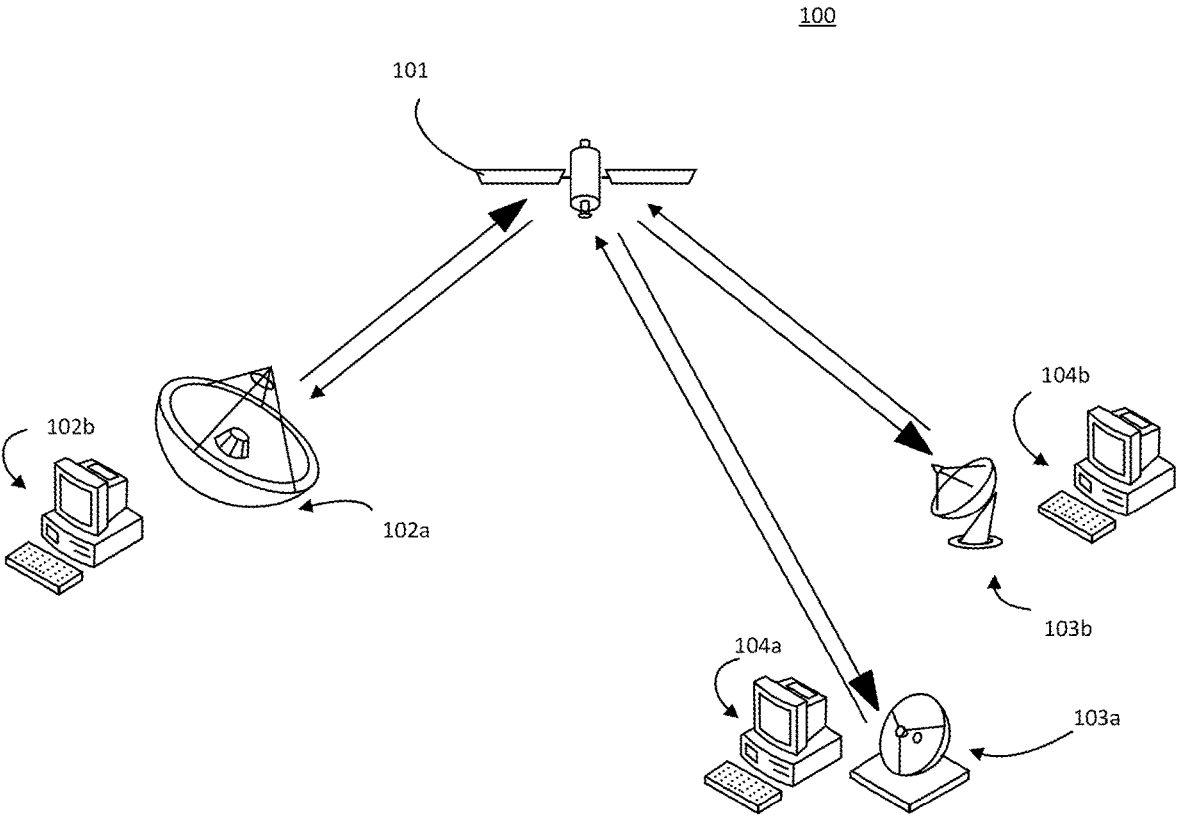
FIG. 1A depicts an example FSOC environment in accordance with an aspect of the application.

In one or more aspects the FSOC system may include plural terminals each terminal including functionality for transmitting and/or receiving optical signals. According to one aspect, FIG. 1A depicts a FSOC environment 100 including one or more terminals. One of the terminals may include a central station hub 102*a*. Central station 102*a* may be located on the ground or in the air/space. Central station hub 102*a* may be operably coupled to a processing device 102*b* to process data. The central station hub 102*a* may bi-directionally communicate with a geosynchronous satellite 101 as well as one or more other terminals.

The satellite 101 may include various exemplary components including but limited to a transmitter and receiver. Satellite 101 may bidirectionally communicate with one or more terminals 103a and 103b. As depicted in FIG. 1A, terminals 103a and 103b may be located on the ground. Each of terminals 103a and 103b may be operably coupled to a processing device 104a and 104b, respectively.

According to another embodiment, one of the above described devices in FIG. 1A will be described in more detail in FIG. 1B. For example, the device 105 of FIG. 1B may be part of a space object (e.g., satellite, space vehicle, space station, terminal, etc.). The space object may be part of a constellation network (e.g., or a space mesh network), such as a network of space objects (e.g., orbiting around earth or other space object). The space object may comprise several devices. In an example embodiment, the terminal may include a transceiver. The components for detecting a loss of signal may be positioned at an optical receiving end of a terminal.

Figure 1B:
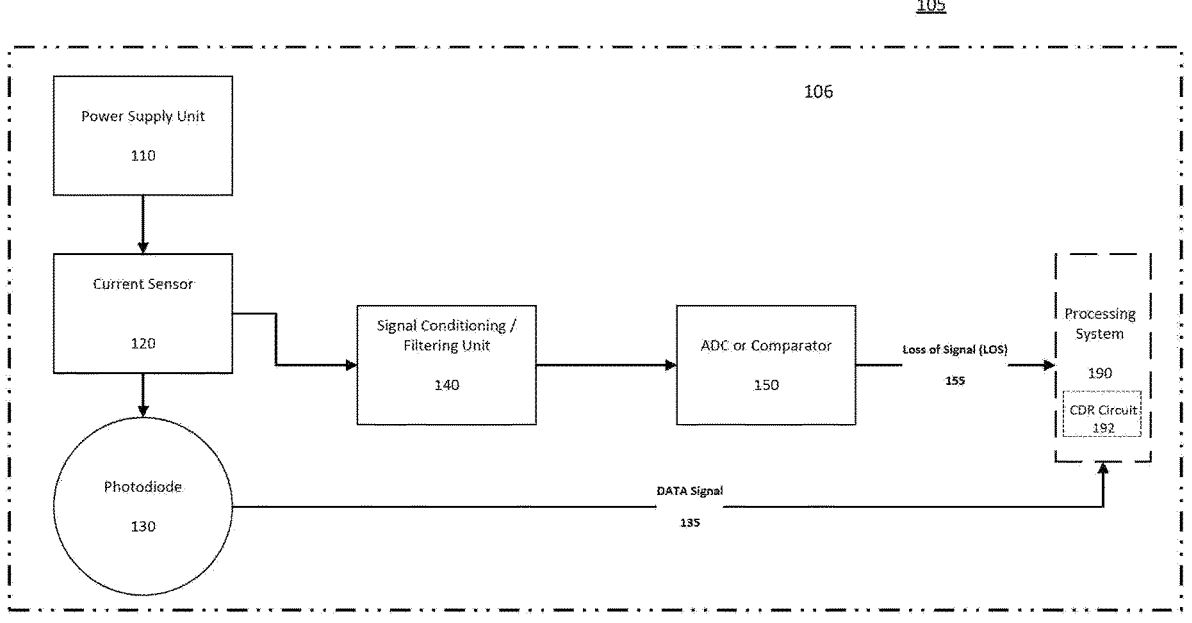
FIG. 1B depicts an example component in an FSOC system in accordance with aspect of the application.

In an example embodiment, the FSOC device 105 system may include an optical receiver 106 indicated by the hashed box in FIG. 1B. The optical receiver 106 may include but is not limited to a power supply 110, a current sensor for the power supply 120 that converts current to a voltage, a photodetector 130, a signal conditioning and/or filtering unit 140, and an analog-to-digital convertor (ADC) and/or comparator 150.

In one embodiment, the power supply unit 110 may supply voltage for the optical receiver 106. In particular the power supply 110 supplies voltage to photodiode 130 and the signal conditioning and/or filtering unit 140. The current sensor 120 is positioned downstream of the power supply 110 and detects a current output between the power supply 110 and the photodetector 130. By detecting the current between the power supply 110 and the photodiode 130, the FSOC system may be configured to effectively evaluate loss of signal resulting from atmospheric fade.

The photodiode 130 may be located downstream of the power supply unit 110. In an example, the photodetector 130 may receive an optical signal, such as an optical signal from an incident light source or laser, and convert the optical signal into a corresponding electrical current. The electrical current may be represented as a data signal 135 as depicted in FIG. 1B. The photodetector may, for example, be a photodiode. In one or more embodiments, the photodiode may be an avalanche photodiode. It is envisaged in this application that the arrangement of the sensor 120 upstream of the photodiode 130 for the purposes of detecting current of the power supply unit helps ensure the integrity of the data signal output from the photodiode 130.

The signal conditioning and/or filtering unit 140 may be located downstream of the power supply unit 110. The signal conditioning and/or filtering unit 140 may be configured to filter and scale a voltage signal. In an example embodiment, the signal conditioning and or filtering unit 140 may include an operational amplifier.

The ADC and/or comparator 150 may be located downstream of the signal conditioning and/or filtering unit 140. In one embodiment, the ADC component of reference indicator 150 may convert an analog voltage signal into a digital logical signal. The digital logical signal may have either a high logic state or a low logic state. The ADC component may output a logical signal based on the voltage signal received from the signal conditioning and/or filtering unit 140.

In another embodiment, the comparator component 150 may compare voltages and output a result. The result may include a high logic state if the difference is above a predetermined and adjustable, e.g., preset, voltage threshold. Alternatively, when the result is below the preset voltage threshold the comparator may output a low logic state. According to an embodiment, a low logic state may provide an indication of loss of an optical signal 155 from a transmitting terminal caused by atmospheric fade.

In yet another embodiment, the indication of loss of signal 155 may be transmitted to an processing system 190. The data signal 135 output from the photodiode 130 may also be transmitted to the processing system 190. The processing system may be remotely located from the optical receiver 106 as suggested by the hashed lines around its box in FIG. 1B. Alternatively, the processing system 190 may be housed within the optical receiver 106. The processing system 190 may include one or more components, such as for example an application specific integrated circuit (ASIC), a field programmable gate array (FPGA), micro-controller or micro-processor.

According to an embodiment, the processing system 190 may include a clock and data recovery (CDR) circuit 192. The CDR circuit 192 may be configured to freeze or hold an electrical signal at a previously known (or stored in memory) instance in time. The previously known instance in time may be at some point prior to the FSOC system exhibiting a loss of signal due to atmospheric fade.

Figure 2:
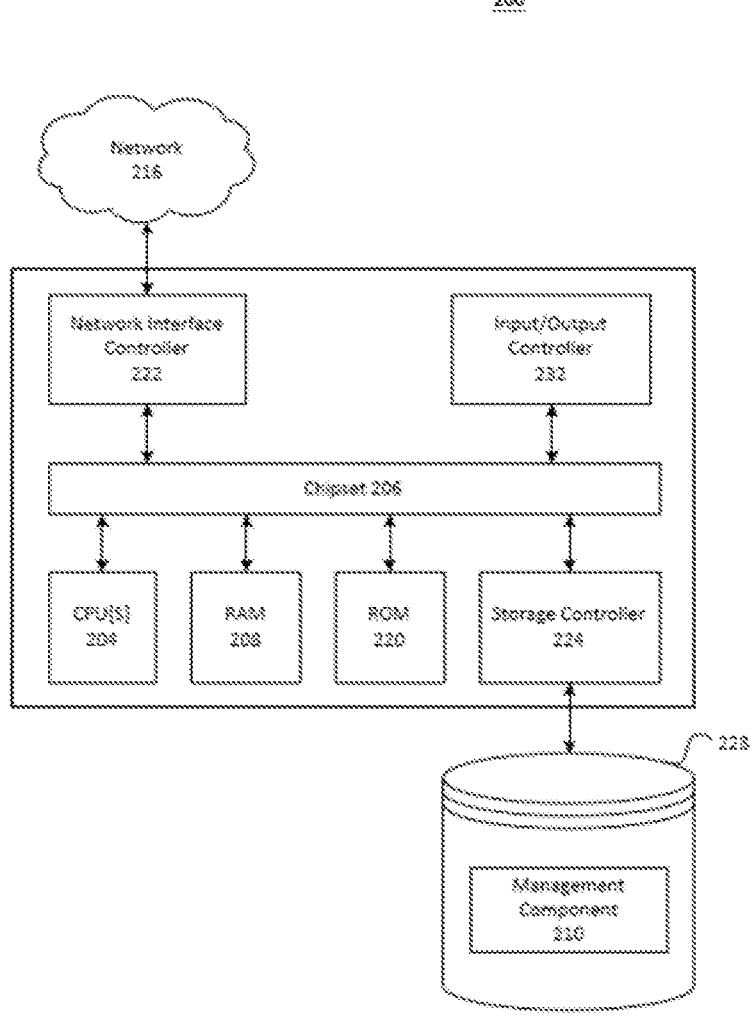
FIG. 2 depicts an example computing device in accordance with an aspect the application.

According to yet another embodiment, the optical receiver 106 may be configured to receive an indication from a controller (described in FIGS. 2 and 3) that the freeze has been removed. In other words, the atmospheric fade has passed.

In yet another embodiment the processing system 190 may be remotely located from the optical receiver 106. For example, it may be located within computing device 200. The computing device 200 may include a baseboard, or "motherboard," which is a printed circuit board to which a multitude of components or devices may be connected by way of a system bus or other electrical communication paths. One or more central processing units (CPUs) 204 may operate in conjunction with a chipset 206. The CPU(s) 204 may be standard programmable processors that perform arithmetic and logical operations necessary for the operation of the computing device 200.

The CPU(s) 204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 204 may be augmented with or replaced by other processing units, such as GPU(s). The GPU(s) may comprise processing units specialized for but not necessarily limited to highly parallel computations, such as graphics and other visualization-related processing.

A chipset 206 may provide an interface between the CPU(s) 204 and the remainder of the components and devices on the baseboard. The chipset 206 may provide an interface to a random access memory (RAM) 208 used as the main memory in the computing device 200. The chipset 206 may further provide an interface to a computer-readable storage medium, such as a read-only memory (ROM) 220 or non-volatile RAM (NVRAM) (not shown), for storing basic routines that may help to start up the computing device 200 and to transfer information between the various components and devices. ROM 220 or NVRAM may also store other software components necessary for the operation of the computing device 1400 in accordance with the aspects described herein.

The computing device 200 may operate in a networked environment using logical connections to remote computing nodes and computer systems through local area network (LAN) 216. The chipset 206 may include functionality for providing network connectivity through a network interface controller (NIC) 222, such as a gigabit Ethernet adapter. A NIC 222 may be capable of connecting the computing device 200 to other computing nodes over a network 216. It should be appreciated that multiple NICs 222 may be present in the computing device 200, connecting the computing device to other types of networks and remote computer systems.

The NIC 222 may include a single FPGA (e.g., or other integrated circuit, such as an ASIC). The master controller may be configured to control multiple modes of operation, such as a mode to establish the link, a mode to maintain the link, and a mode to close the link. The one or more controllers (e.g., or master controller) can control operation of communications terminals as follows. Command and control from the host satellite can signal a communications request and/or provides ephemeris data for the desired satellite node. One or more lasers can be turned on (e.g., at full power). The output (e.g., combined output) of the one or more lasers can be defocused to provide a wide-field-of-view beacon for acquisition. The one or more lasers can be modulated with a beacon tone (e.g., at substantially 100% with a ~5 kHz acquisition tone). Detector boards, a gimbal, and MEMS control boards can be powered on.

The computing device 200 may be connected to a mass storage device 228 that provides non-volatile storage for the computer. The mass storage device 228 may store system programs, application programs, other program modules, and data, which have been described in greater detail herein. The mass storage device 228 may be connected to the computing device 200 through a storage controller 224 connected to the chipset 206. The mass storage device 228 may consist of one or more physical storage units. A storage controller 224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 200 may store data on a mass storage device 228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 228 is characterized as primary or secondary storage and the like.

For example, the computing device 200 may store information to the mass storage device 228 by issuing instructions through a storage controller 224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 200 may further read information from the mass storage device 228 by detecting the physical states or characteristics of one or more particular locations within the physical storage units.

Figure 3:
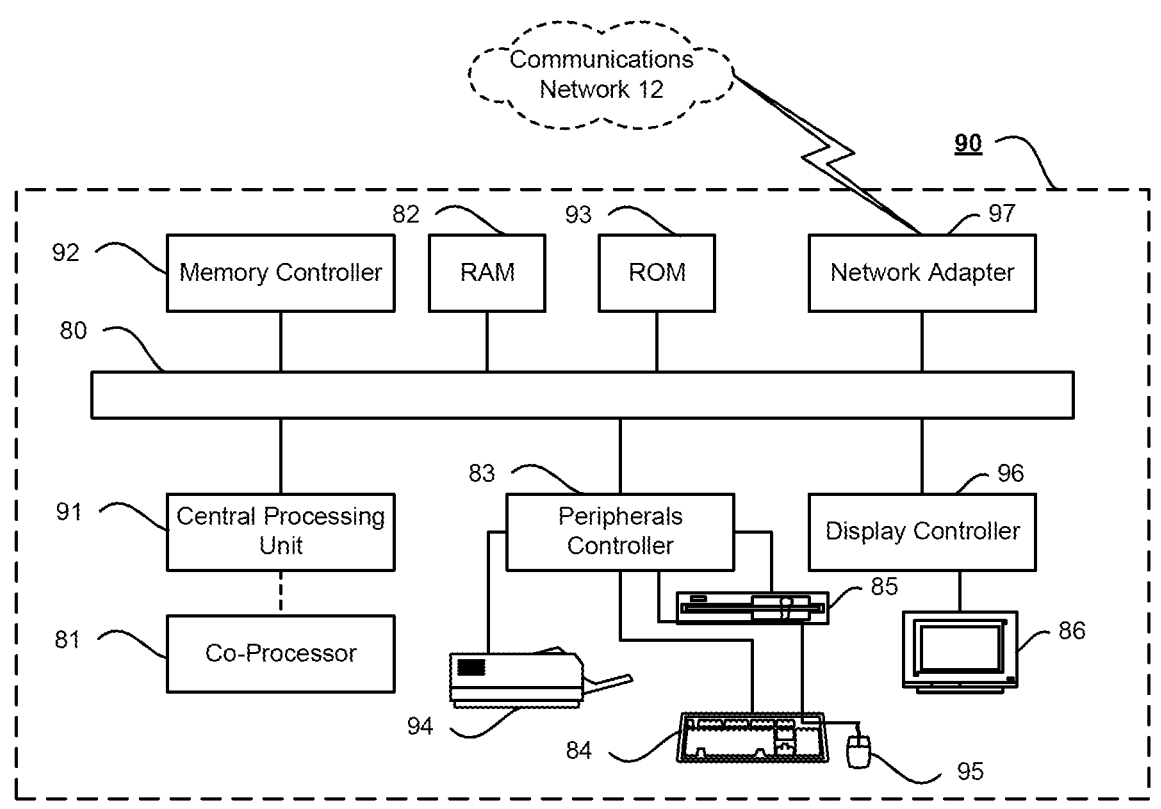
FIG. 3 depicts an example computing system in accordance with an aspect of the application.

According to yet another embodiment, FIG. 3 depicts a block diagram of an exemplary computing system 90. Computing system 90 may include the computing device 200 of FIG. 2 as one or more of its controllers. Alternatively, computing system 90 may be used in conjunction with computing device 200.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 200 to operate.

Memories coupled to system bus 80 include RAM 82 and ROM 93. Such memories may include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a cathode-ray tube (CRT)-based video display, a liquid-crystal display (LCD)-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 200 to an external communications network, such as network 12, to enable the computing system 200 to communicate with other equipment in the network.

Figure 4:
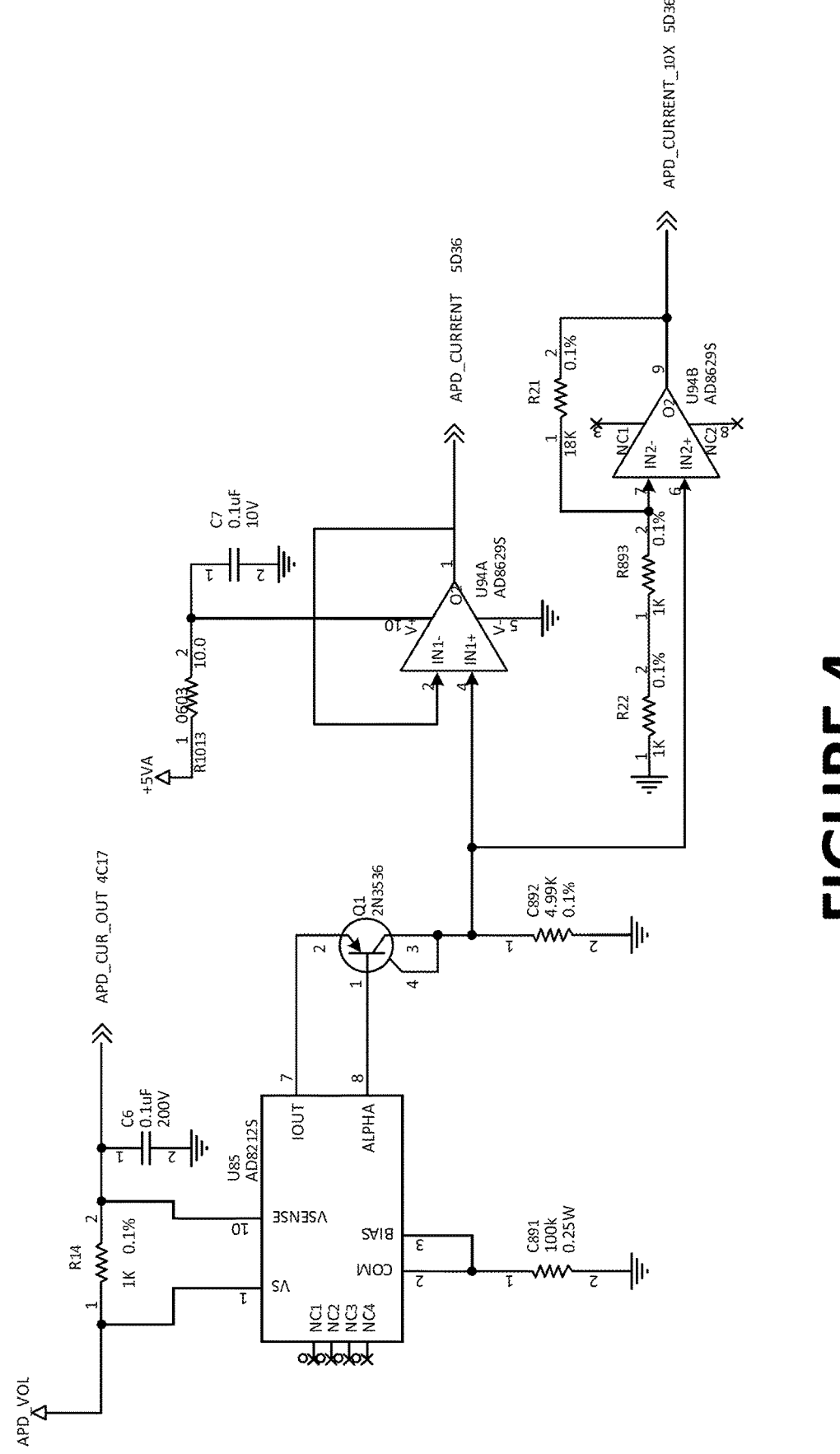
FIG. 4 depicts an example circuit diagram in accordance with an aspect of the application.

According to even a further embodiment, FIG. 4 depicts an exemplary circuit 400 housed in an optical receiver. For example, as shown in FIG. 4, U85 in combination with Q1 and the surrounding passive components represent a current sensor, such as for example, current sensor 120. The U85/Q1 circuit converts the photoreactor current being monitored via R14 to a voltage.

Reference indicators U94A and U94B represent operational amplifiers in the circuit. U94A and U94B may buffer, scale and filter the voltage. It is envisaged that one or more operational amplifiers may be housed in an optical receiver. The APD currents leaving each respective operational amplifier U94A, U94B ultimately is transmitted to a comparator 150 for determining loss of signal associated with the communication link between plural terminals (e.g., transmitter terminal and receiver terminal).

According to another aspect of the application, a method for detecting signal loss in a FSOC system is disclose. In an example, FIG. 5 depicts a flowchart 500 describing one or more steps of the method. In Step 502, a current of a voltage supply being transmitted to a photodiode is monitored in a FSO system. The current may be associated with a communication link.

In Step 504, a determination is made whether the current is below a predetermined threshold. The determination may indicate a degradation of signal loss of the communication link. The indication of a loss of signal may be associated with atmospheric fade In Step 506, the indication of the degraded signal is transmitted to a processing system. In an embodiment, the processing system may be remotely located from the comparator. In an embodiment, the processing system may include an FPGA.

Further in Step 508, the FSOC system may receive, via the processing system, feedback that a clock associated with the communication link was frozen at an instance prior to the indication of the signal being below a predetermined threshold.

According to yet another embodiment, the FSOC system may receive an indication from the processing system that the freeze placed on the second/electrical signal has been removed.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

It is to be understood that the methods and systems are not limited to specific methods, specific components, or to particular implementations. It is also to be understood that the terminology used herein is for the purpose of describing particular embodiments only and is not intended to be limiting.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   monitoring a current of a voltage supply being transmitted to a photodiode, wherein the current is associated with a communication link;
   determining, via a comparator, a first signal associated with the current is below a predetermined threshold indicating signal loss of the communication link;
   transmitting the indication of signal loss to a processing system; and
   receiving, via the processing system, feedback that a second signal associated with the communication link was frozen at an instance prior to the indication of signal loss.

2. The method of claim 1, wherein the processing system includes an FPGA and a CDR circuit.

3. The method of claim 1, further comprising:
   determining, via a comparator, the signal is above the predetermined threshold.

4. The method of claim 3, further comprising:
   receiving, from the processing system, an indication the freeze of the second signal has been lifted.

5. The method of claim 1, further comprising:
   transmitting, to the processing system, the second signal output from the photodiode.

6. The method of claim 1, wherein the indication of signal loss is associated with atmospheric fade.

7. The method of claim 1, wherein the comparator and photodiode are located in an optical receiver.

8. The method of claim 1, wherein the processing system is remotely located from the comparator and photodiode.

9. The method of claim 1, wherein the comparator receives the first signal from a signal conditioning unit (SCU).

10. The method of claim 9, wherein the SCU is an operational amplifier.

\* \* \* \* \*